United States Patent
Hornung et al.

(10) Patent No.: US 11,481,220 B2
(45) Date of Patent: Oct. 25, 2022

(54) BRANCH PREDICTION IN A DATA PROCESSING APPARATUS

(71) Applicant: ARM LIMITED, Cambridge (GB)

(72) Inventors: Alexander Alfred Hornung, Cambridge (GB); Adrian Viorel Popescu, Cambridge (GB)

(73) Assignee: Arm Limited, Cambridge (GB)

( * ) Notice: Subject to any disclaimer, the term of this patent is extended or adjusted under 35 U.S.C. 154(b) by 517 days.

(21) Appl. No.: 15/334,628

(22) Filed: Oct. 26, 2016

(65) Prior Publication Data

US 2017/0139717 A1    May 18, 2017

(30) Foreign Application Priority Data

Nov. 17, 2015 (GB) ...................................... 1520250

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01)

(58) Field of Classification Search
CPC ... G06F 9/3806; G06F 9/30058; G06F 9/3808
See application file for complete search history.

(56) References Cited

U.S. PATENT DOCUMENTS

| | | | |
|---|---|---|---|
| 6,178,498 B1 * | 1/2001 | Sharangpani | G06F 9/3844 711/213 |
| 6,792,524 B1 | 9/2004 | Peterson et al. | |
| 7,434,037 B2 * | 10/2008 | Park | G06F 9/3806 712/238 |
| 7,707,396 B2 * | 4/2010 | Bradford | G06F 9/30094 712/238 |
| 7,788,473 B1 | 8/2010 | Nelson et al. | |
| 2001/0032308 A1 | 10/2001 | Grochowski et al. | |
| 2003/0172259 A1 * | 9/2003 | Mori | G06F 9/3806 712/234 |

(Continued)

OTHER PUBLICATIONS

Search Report for GB1520250.0 dated Apr. 28, 2016, 4 pages.

*Primary Examiner* — Jyoti Mehta
*Assistant Examiner* — Kasim Alli
(74) *Attorney, Agent, or Firm* — Nixon & Vanderhye P.C.

(57) ABSTRACT

An apparatus comprises instruction fetch circuitry to retrieve instructions from storage and branch target storage to store entries comprising source and target addresses for branch instructions. A confidence value is stored with each entry and when a current address matches a source address in an entry, and the confidence value exceeds a confidence threshold, instruction fetch circuitry retrieves a predicted next instruction from a target address in the entry. Branch confidence update circuitry increases the confidence value of the entry on receipt of a confirmation of the target address and decreases the confidence value on receipt of a non-confirmation of the target address. When the confidence value meets a confidence lock threshold below the confidence threshold and non-confirmation of the target address is received, a locking mechanism with respect to the entry is triggered. A corresponding method is also provided.

13 Claims, 7 Drawing Sheets

(56) References Cited

U.S. PATENT DOCUMENTS

| | | | |
|---|---|---|---|
| 2003/0212882 A1* | 11/2003 | Bonanno | G06F 9/3806 712/238 |
| 2010/0306515 A1 | 12/2010 | Al-Otoom et al. | |
| 2014/0201508 A1* | 7/2014 | Busaba | G06F 9/38 712/239 |
| 2017/0068539 A1* | 3/2017 | Dundas | G06F 9/3806 |

* cited by examiner

BRANCH PREDICTION IN A DATA PROCESSING APPARATUS

This application claims priority to GB Patent Application No. 1520250.0 filed Nov. 17, 2015, the entire content of which is hereby incorporated by reference.

TECHNICAL FIELD

The present disclosure relates to the field of data processing. More particularly it relates to branch prediction in a data processing apparatus.

BACKGROUND

In a data processing apparatus which executes instructions, processing efficiency may be gained by employing mechanisms to fetch instructions from storage sufficiently in advance of their execution that the latency associated with their retrieval from storage does not delay the execution process. Whilst such a mechanism is relatively simple in the case of the execution of sequential instructions (e.g. instructions stored at sequential memory addresses and referenced by a linearly incrementing program counter), complexities arise when the instructions include branch instructions which may cause the instruction flow to jump to a non-sequential instruction at a different (i.e. non-sequential) memory address in dependence on certain conditions which the branch instruction tests. In order to successfully fetch required instructions in advance which include such branch instructions, provision may therefore be made for the instruction fetching to be able to predict what the target address of the non-sequential branch will be. Furthermore, whereas some "direct" branch instructions may cause a branching to a fixed (known) instruction address, other "indirect" branch instructions may derive the target instruction address from another source, for example from the content of a register or another memory location, making their prediction more difficult.

In addition to the above-mentioned features of direct and indirect branch instruction prediction, the more complex (and therefore potentially more accurate) the prediction mechanism which is provided, the slower such a prediction mechanism will typically be and may be arranged later in the data processing pipeline or indeed in additional pipeline stages. Conversely, relatively lightweight, simpler prediction mechanisms may be provided, placed earlier in the data processing pipeline, to produce a faster, but typically less reliable, prediction. Moreover, the more complex the prediction mechanism, the greater the circuitry area that such a mechanism will occupy as well.

SUMMARY

In at least some embodiments the present techniques provide an apparatus comprising: instruction fetch circuitry to retrieve instructions from storage by reference to addresses at which the instructions are stored; branch target storage to store entries comprising source and target addresses for branch instructions, wherein the branch target storage is capable of storing a confidence value associated with an entry and the branch target storage is responsive to a current address matching a source address in the entry and the confidence value exceeding a confidence threshold to issue a signal to the instruction fetch circuitry to retrieve a predicted next instruction from a target address in the entry; and branch confidence update circuitry to increase the confidence value of the entry in response to receipt of a confirmation of the target address and to decrease the confidence value of the entry in response to receipt of a non-confirmation of the target address, wherein the branch confidence update circuitry is responsive to the confidence value meeting a confidence lock threshold below the confidence threshold and receipt of the non-confirmation of the target address to trigger a locking mechanism with respect to the entry.

In at least some embodiments the present techniques provide a method of data processing comprising: retrieving instructions from storage by reference to addresses at which the instructions are stored; storing entries comprising source and target addresses for branch instructions in a branch target storage; storing a confidence value associated with an entry in the branch target storage; retrieving a predicted next instruction from a target address in the entry, when a current address matches a source address in the entry and the confidence value exceeds a confidence threshold; increasing the confidence value in response to receipt of a confirmation of the target address; decreasing the confidence value of the entry in response to receipt of a non-confirmation of the target address; triggering a locking mechanism which marks the entry as a locked entry in response to the confidence value meeting a confidence lock threshold below the confidence threshold and receipt of the non-confirmation of the target address.

In at least some embodiments the present techniques provide an apparatus comprising: means for retrieving instructions from storage by reference to addresses at which the instructions are stored; means for storing entries comprising source and target addresses for branch instructions; means for storing a confidence value associated with an entry in the means for storing entries; means for retrieving a predicted next instruction from a target address in the entry, when a current address matches a source address in the entry and the confidence value exceeds a confidence threshold; means for increasing the confidence value in response to receipt of a confirmation of the target address; means for decreasing the confidence value of the entry in response to receipt of a non-confirmation of the target address; means for triggering a locking mechanism which marks the entry as a locked entry in response to the confidence value meeting a confidence lock threshold below the confidence threshold and receipt of the non-confirmation of the target address.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
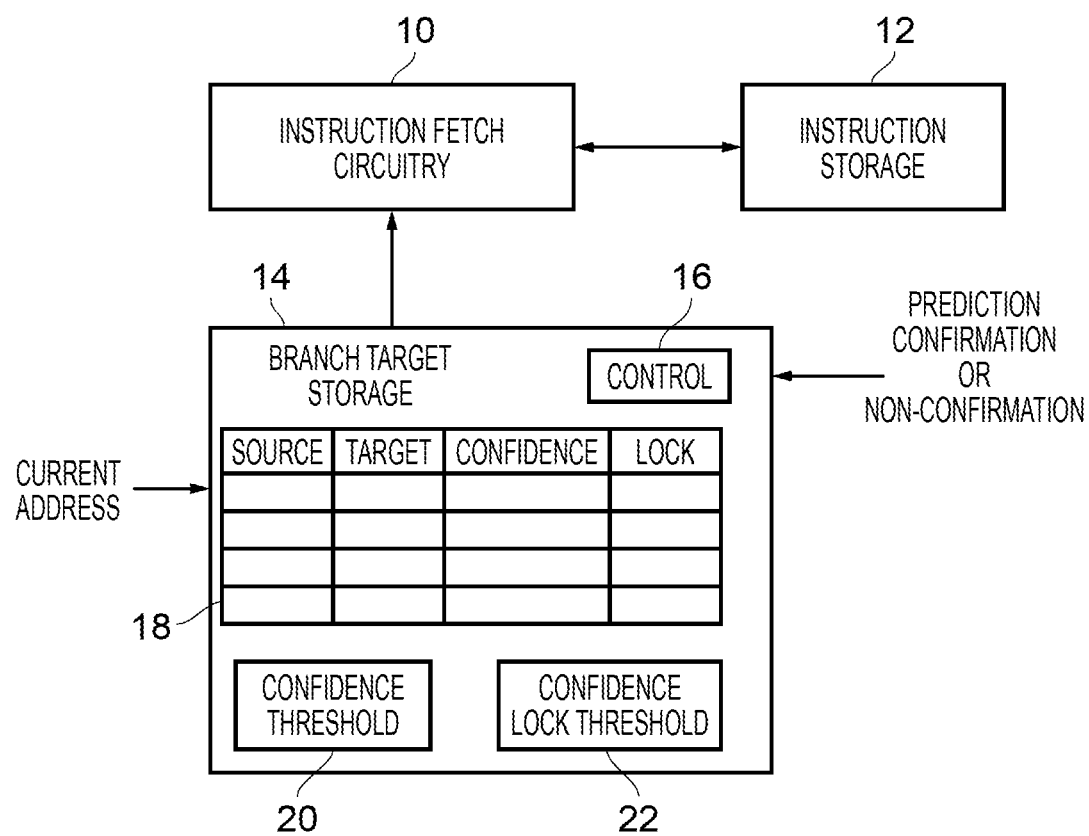
FIG. 1 schematically illustrates apparatus comprising branch target storage in one embodiment.

At least some embodiments provide an apparatus comprising: instruction fetch circuitry to retrieve instructions from storage by reference to addresses at which the instructions are stored; branch target storage to store entries comprising source and target addresses for branch instructions, wherein the branch target storage is capable of storing a confidence value associated with an entry and the branch target storage is responsive to a current address matching a source address in the entry and the confidence value exceeding a confidence threshold to issue a signal to the instruction fetch circuitry to retrieve a predicted next instruction from a target address in the entry; and branch confidence update circuitry to increase the confidence value of the entry in response to receipt of a confirmation of the target address and to decrease the confidence value of the entry in response to receipt of a non-confirmation of the target address, wherein the branch confidence update circuitry is responsive to the confidence value meeting a confidence lock threshold below the confidence threshold and receipt of the non-confirmation of the target address to trigger a locking mechanism with respect to the entry.

The branch target storage of the apparatus associates (in a given entry) a target address with a source address, such that when a current address being handled by the apparatus matches the source address, the branch target storage can generate an indication of the corresponding target address, such that instruction fetch circuitry can retrieve what is predicted to be the next instruction from that target address. Further, the branch target storage associates a confidence value with each entry, and the retrieval of an instruction from the target address is dependant on the confidence value associated with the entry exceeding a confidence threshold. Using to this mechanism, the branch target storage can effectively estimate the likelihood that its prediction for the target instruction from a source instruction will indeed be the target instruction stored at the target address which the branch target storage hold in association with the source address. The confidence value of each entry can take a range of values and branch confidence update circuitry forming part of the apparatus adjusts the confidence value of an entry to reflect how successful this prediction has previously been. When a target address is confirmed, the confidence value is increased and when a target address is not confirmed (i.e. a non-confirmation signal is received), the confidence value is decreased.

The present techniques recognise that certain types of branches could often be poorly predicted by a branch target storage which only maintains single target address for a given source address, even when using a confidence value with respect to a confidence threshold to determine whether to make the prediction. In particular, the present techniques recognise that indirect branches which are polymorphic, i.e. which in execution typically have multiple different target addresses for the branch, could be poorly predicted. Whilst a polymorphic branch may be reliably predicted when there is some stability (i.e. lack of change) in the target address, frequent changes in the target address could result in many wasted fetches for mis-predicted branches. In the worst case, every single occurrence of a highly polymorphic indirect branch could be mis-predicted. The present techniques address this issue by setting a confidence lock threshold for an entry in the branch target storage, and when the confidence value reaches this confidence lock threshold, and furthermore an indication is received that the target address predicted for this entry was not correct (the non-confirmation of the target address), a locking mechanism is triggered with respect to the entry.

The locking mechanism may take a variety of forms, but the ultimate aim of the locking mechanism, if carried out in full, is that the entry becomes a locked entry, this meaning that the entry remains in the branch target storage, but cannot be used to predict target addresses. Indeed, the present techniques recognise that a benefit of this arrangement is that locked entries in the branch target storage can be treated in the same way as normal entry in that they are kept active and not deactivated, this allowing the entry to serve as part of a "negative cache" of indirect branches that should not be predicted. If instead the entry had been released and deactivated instead of being locked down, the next time that branch was encountered a new entry would be allocated and the prediction mechanism would start again from scratch. However, keeping the entry active, but locked down, avoids the entry from restarting in this manner (until it is naturally replaced due to capacity misses in the branch target storage). Thus, where a polymorphic indirect branch goes through a phase of being predictable (when its target does not frequently change), the corresponding entry in the branch target storage can be used to predict, with a useful success rate, the target address, but when the polymorphic indirect branch later becomes more polymorphic (i.e. its target address is frequently changing), the entry in the branch target storage is locked down, though for the time being remains there, usefully explicitly indicating that no target predictions should be made for this branch.

As mentioned above, the locking mechanism may take a variety of forms, but the locking mechanism may mark the entry as a locked entry and the branch confidence update circuitry is responsive to the locked entry to cease further modification of the confidence value of the locked entry. The marking of the entry as a locked entry and the response of the branch confidence update circuitry to the locked entry that no further modification of the confidence value of the locked entry occurs, then means that, because the confidence lock threshold is necessarily below the confidence threshold, it is not possible for the confidence value of this entry to exceed the confidence threshold such that the branch target storage will issue the signal to the instruction fetch circuitry to access a predicted target address for this entry. In other words, the locking of the entry prevents further confidence modification, which could allow such prediction to resume.

Whether or not the confidence value of a locked entry can be further modified, the branch target storage may be responsive to the current address matching the source address in the locked entry to prevent issuance of the signal to the instruction fetch circuitry to retrieve the predicted next instruction from the target address. In other words, once the entry is locked, the signal to the instruction fetch circuitry to retrieve a predicted next instruction is blocked, and the matching of the current address with the source address in this locked entry will not result in the target address being accessed.

As described above, the locking mechanism may result in various changes with respect to how an entry is handled once it is locked. The locking mechanism may comprise lock counter circuitry (i.e. a counter) to hold a lock counter value for the entry and to update the lock counter value towards a lock trigger value in response to the triggering of the locking mechanism, wherein the lock counter value having the lock trigger value indicates that the entry is locked. Thus, when the branch confidence update circuitry triggers the locking mechanism, the lock counter circuitry responds by updating the lock counter value towards the lock trigger value. This may only require one step to reach the lock trigger value or may be a multiple step process, whereby the lock counter value can take several intermediate values before it reaches the lock trigger value. At the lock trigger value the lock counter value is then understood to indicate that the entry is locked. In other words, the lock counter circuitry implements a mono-directional ("ratcheting") update, wherein once initially triggered the lock counter value may only be updated towards the lock trigger value. This arrangement thus means that once the confidence value of a given entry reaches the confidence lock threshold, a ratchet effect is engaged, whereby regardless of correct predictions a given number of incorrect predictions for this entry will necessarily result in this entry being locked.

The range of values which the confidence value may be given may vary depending on the implementation, and when a lock counter is provided the range of values which the lock value may take may also vary depending on the implementation. In some embodiments in which both confidence values and lock counter values are employed, a range of the confidence value for the entry exceeds a range of the lock values for the entry. In effect this means that, depending on the thresholds which are set, a greater degree of movement in the confidence value is possible than in the lock value, and in other words, once the confidence value has reached the point at which the locking mechanism is triggered, relatively fewer mispredictions are required for the entry to be locked. If it is important for mispredictions to be avoided, only a small range of the lock values may be implemented to ensure that an entry is quickly locked if mispredictions occur.

In some embodiments the branch confidence update circuitry is responsive to the confidence value reaching a confidence lock release threshold above the confidence lock threshold to abort the locking mechanism and to cause the lock counter circuitry to update the lock value away from the lock trigger value in response to receipt of the confirmation of the target address. Thus, whilst as described above the locking mechanism may be such that once it is initially triggered it is inevitable that the corresponding entry will (perhaps after a couple of iterations of the lock counter circuitry) be locked, these embodiments can be arranged such that if the confidence value reaches a significantly high value again before the entry has been finally locked, i.e. the confidence value crossed the confidence lock release threshold, the locking mechanism may be aborted and the lock counter circuitry can update the lock value away from the lock trigger value. For example, where the lock counter circuitry is configured, when the locking mechanism is triggered, to decrement the lock counter, this mechanism may be provided to enable the lock counter circuitry, when the confidence rises high enough, to increment the lock counter. Accordingly, if the branch target storage, after a period of unsuccessful prediction, is once more able to successfully predict branch targets in a repeatable fashion, it may be advantageous to enable the corresponding entry within the branch target storage to be fully reinstated and not to inevitably end up as locked.

In some embodiments the branch target storage is responsive to receipt of the non-confirmation of the target address to update the entry with a confirmed target address for the source address. This then enables the content of the branch target storage to mirror the last target address for the branch in its corresponding entry, based on the philosophy that the last target address is that which, other factors notwithstanding, is most likely to be correct at the next encounter of this branch. Moreover, where the confirmed target address is provided by a further branch target predictor in the apparatus (for example a larger branch target address cache), this supports the branch target storage in tracking the predictions of that further branch target predictor.

Whilst the branch target storage may update the entry with the last target address, it may also be provided with storage which enables a history of more than one recent confirmed target address to be stored, for example a set of recent last target address. Accordingly in some embodiments the branch target storage is responsive to receipt of the non-confirmation of the target address to update the entry with a replacement target address for the source address, wherein the replacement target address is determined from a history of more than one recent confirmed target addresses. For example, the replacement target address may be chosen by majority from the more than one recent confirmed target addresses, by attributing greater significance to a target address the more recently it has been used, or by other such selection mechanisms.

As mentioned above, one context in which the present techniques may be of particular benefit is when branch instructions are encountered which define indirect branches, and in particular those which tend to be polymorphic, since this may cause difficulties for a simple branch target storage structure such as one which only stores one target address for each source address. In some embodiments the apparatus further comprises branch target prediction circuitry comprising further branch target storage capable of storing entries comprising target addresses for branch instructions, wherein the further branch target storage is capable of storing at least two different target addresses in association with the source address, and the branch target prediction circuitry is responsive to the current address corresponding to the source address to select between the at least two target addresses in dependence on history information stored for the current address to provide a target address prediction. This further branch target storage can store at least two different target addresses in association with each source address and as such is also referred to here as a polymorphic branch target storage. Selection between the more than one target addresses is performed by the branch target prediction circuitry using history information stored for the current address, for example one or more indications of how the branch corresponding to that current address has been previously resolved.

The branch target storage in the apparatus and the branch target prediction circuitry may be arranged to perform different roles in the apparatus and in some embodiments the apparatus has a pipeline arrangement and the branch target storage precedes the instruction fetch circuitry in the pipeline arrangement and the branch target prediction circuitry follows the instruction fetch circuitry in the pipeline arrangement. Accordingly therefore the branch target storage, being early in the pipeline, can benefit from being a relatively simple structure able to perform a faster determination of a branch target (where possible), whilst the later branch target prediction circuitry which follows in the pipeline is able to more accurately determine the target of a given branch.

The outcome of the branch target prediction circuitry may therefore be used in some embodiments to improve the performance of the branch target storage, wherein the branch target prediction circuitry comprises target address comparison circuitry to perform a comparison of its target address prediction with the target address from the branch target storage and to signal either the confirmation of the target address or the non-confirmation of the target address in dependence on a result of the comparison. Accordingly, in such embodiments it is the comparison of the target address prediction generated by the branch target prediction circuitry which determines whether the target address of the entry in the branch target storage is confirmed or not confirmed.

The branch target prediction circuitry may be variously configured, but in some embodiments the branch target prediction circuitry comprises a second further branch target storage to store entries comprising source and target addresses for branch instructions, wherein the branch target prediction circuitry is responsive to no entry in the further branch target storage being selected to provide the target address prediction from the second further branch target storage. The second further branch target storage thus provides a backup to the further branch target storage, for example by having a one-to-one association of source and target addresses which is not history dependent.

Alternatively, in some embodiments the branch target prediction circuitry is responsive to no entry in the further branch target storage being selected to provide the target address from the branch target storage as the target address prediction. In other words, the branch target storage itself may provide the backup to the further branch target storage.

In addition to the branch prediction capabilities of the apparatus, when the branch is executed and the true outcome of the branch is resolved, this information may be made use of in order to update the predictive capabilities of the apparatus in various ways. For example, in some embodiments the apparatus further comprises branch resolution circuitry to signal the confirmation of the target address or the non-confirmation of the target address in dependence on a branch resolution of a branch instruction stored at the source address. Thus, the "confirmation" and "non-confirmation" may be definitive with respect to the true outcome of each respective branch, as opposed to the prediction made by another predictor.

In some embodiments the branch target storage is responsive to the current address matching the source address in the entry and the confidence value not exceeding the confidence threshold to issue a signal to the instruction fetch circuitry to retrieve a next instruction from an address which sequentially follows the current address. Thus where on the basis of the confidence threshold it is determined that the target address held should not be predicted, by default the instruction which sequentially follows the branch instruction (i.e. at the next sequential address) may instead be taken.

Some particular embodiments are now described with reference to the accompanying figures.

FIG. 1 schematically illustrates apparatus comprising instruction fetch circuitry 10, instruction storage 12 and branch target storage 14. It will be understood that these components will typically form part of a larger data processing apparatus, in which the instructions stored in the instruction storage 12 and retrieved by the instruction fetch circuitry 10 will be executed, causing data processing operations to be carried out, but for clarity of illustration and discussion of the present techniques, only components 10, 12 and 14 are shown in FIG. 1. Branch target storage 14 comprises control circuitry 16 and a set of entries 18, wherein each entry stores a source address, a target address, a confidence value, and a lock indication. Only four entries are shown in the set of entries 18 in FIG. 1, but this is merely for clarity of illustration and the branch target storage 14 can be arranged to store any number of entries appropriate to the system in which it is implemented. The function of the branch target storage 14 is, where possible, to provide a prediction of the target address for a given branch instruction. Accordingly, in response to the receipt of a "current address", for example that generated by address generation circuitry, the branch target storage 14 (under the control of the control circuitry 16) looks up this address in the entries which it currently has stored. If the address matches a source address in one of the entries, then the target address stored in association with that source address is a candidate for providing to the instruction fetch circuitry 10, so that it can retrieve the instruction stored at this location from the instruction storage 12. Whether or not the branch target storage 14 passed a target address to the instruction fetch circuitry 10 as a prediction for the target of a given branch instruction further depends on the confidence value stored in association with the entry and the lock indication (or value) also stored in association with the entry. A confidence threshold 20 is defined for the branch target storage 14, which the control circuitry 16 references when determining if the target address should be provided as a prediction. In particular, it is required that the confidence value stored in association with a given entry exceeds the defined confidence threshold 20 in order for the branch target storage 14 to signal to the instruction fetch circuitry that it should retrieve the instruction stored at the target address. However, the lock indication (or value) stored in association with the entry also determines the use of the entry, in that if the indication or value stored in association with the entry indicates that the entry is locked, then the target address will not be passed to the instruction fetch circuitry as a prediction. As will be described in more detail with reference to the figures which follow, the control circuitry 16 administers control over the confidence value stored for each entry and the corresponding lock value, in dependence on the success that use of this prediction has had. In essence, confirmation of the prediction causes the confidence value to rise, whilst non-confirmation (i.e. a signal indicating that the prediction was not correct) causes the confidence value to be decreased. Additionally, the control circuitry 16 monitors the confidence value with respect to the defined confidence lock threshold 22 (which is lower than the confidence threshold 20) and if the confidence value of an entry reaches the confidence lock threshold 22 and a further non-confirmation signal with respect to this entry (i.e. with respect to the branch instruction stored at the source address of this entry) is received, the control circuitry 16 triggers a locking mechanism with respect to this entry.

In one configuration, the locking mechanism acting with respect to the entry (implemented by the control circuitry 16) comprises setting an indication or value for the lock component of the entry, indicating that the entry is now locked. However, in other configurations, as will be described in more detail with reference to the figures which follow, the lock values stored in association with each entry of the branch target storage 14 can take a number of values. The mechanism is then such that the lock value begins at a value indicating that this entry is not locked, and can be progressed through one or more intermediate values (at which the entry is also not yet locked) towards a final value which indicates that the entry is locked. Moreover, the lock value, for example taking the form of a lock counter may be implemented in such a manner that it can only be adjusted in the direction of the locked entry and cannot be updated away from the value indicating the locked entry. Thus, whilst the confidence value may fluctuate in dependence of the relative success of the branch target storage in predicting the target address for a given branch instruction, once the lock mechanism is triggered, the lock value can only progress towards the locked value, and once it reaches that locked value no further update to the confidence value is allowed. Thus the entry thus remains locked until it is naturally replaced due to a capacity miss in the branch target storage. However, it should be noted that the locked entry remains active (and is not deactivated) such that locked down entries in the branch target storage are treated in the same way as normal entries, meaning that locked entries effectively provide a "negative cache" of indirect branches that should not be predicted using the branch target storage.

Figure 2:
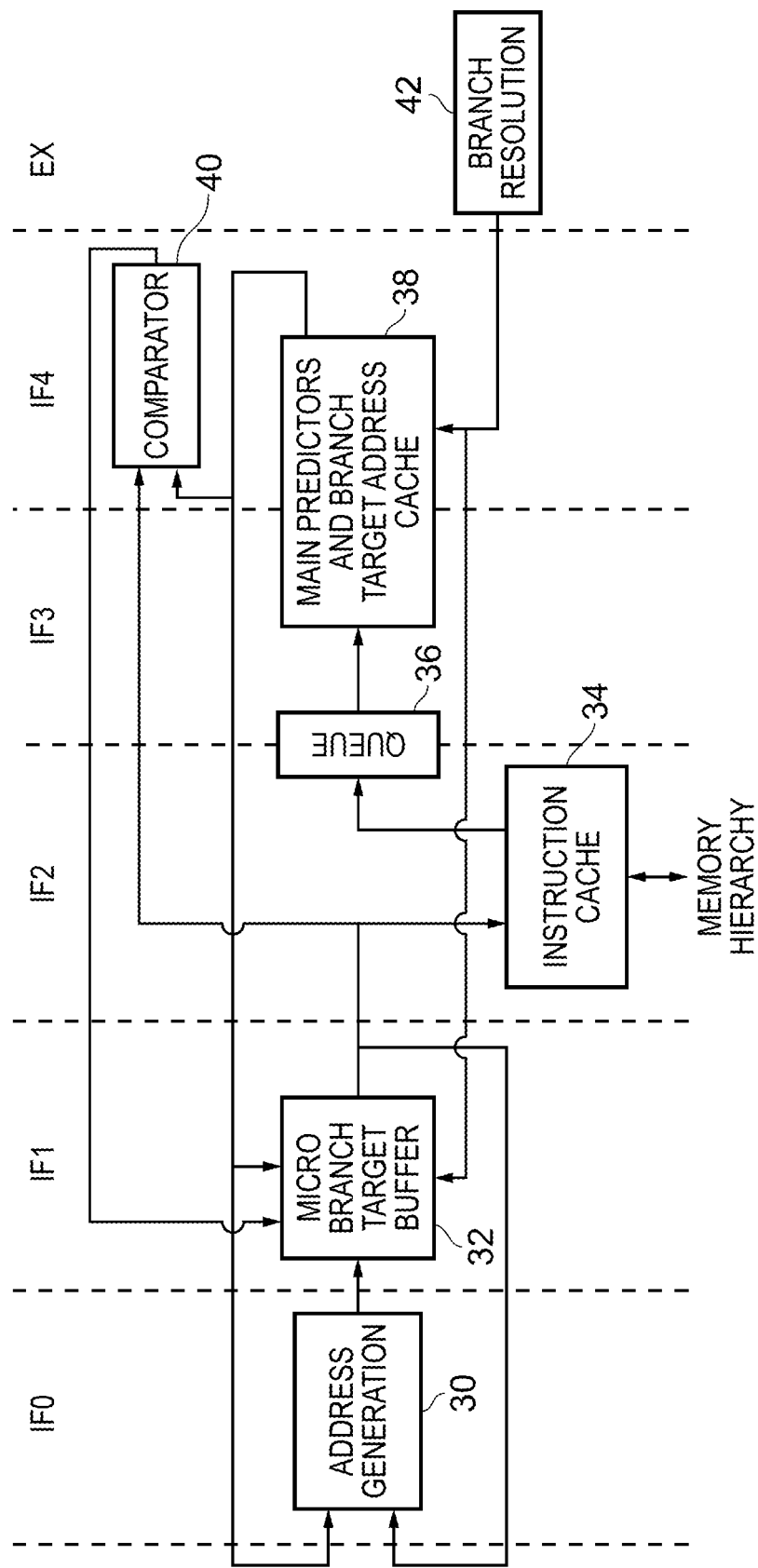
FIG. 2 schematically illustrates a pipelined data processing apparatus comprising branch target storage and further branch target storage in one embodiment.

FIG. 2 schematically illustrates a selection of components of a data processing apparatus which has a pipelined arrangement, and it can be readily seen from FIG. 2 that only a set of Instruction Fetch (IF) stages and one Execution (EX) stage are shown, since these are the stages of particular relevance to the present techniques. Instruction fetch stage IF0 comprises address generation circuitry 30 which generates the sequence of addresses from which instructions are to be retrieved from memory. It will be understood, with reference to the present techniques, that the general pattern of these addresses may be that they are numerically sequential, corresponding to sequential program instructions stored at these memory addresses, but that where a program instruction is a branch instruction, this may require the next address (the target address) to be generated which jumps to an entirely different memory address. The address generation circuitry 30 interacts with the branch target storage provided at stage IF1, namely the micro branch target buffer (μBTB) 32. The μBTB 32 is generally configured in accordance with the layout of the branch target storage 14 of FIG. 1, but further detail of the configuration of the μBTB 32 is given below with reference to FIG. 3. A prediction generated by the μBTB 32 is passed back to the address generation at circuitry 30, such that the address generation circuitry can continue its address generation from that address, and is also passed to the instruction cache 34 in instruction fetch stage IF2. Where the instruction is already to be found in instruction cache 34 it is directly returned from there, but otherwise the request for this instruction is passed out further in the memory hierarchy (which may comprise one or more further cache levels) ultimately reaching (if no cache hit occurs before then) a memory storage device and being returned from there. Once retrieved, the instruction is returned to queue 36 on the boundary of instruction fetch stage IF3, and from there it is passed to a set of main predictors and a branch target address cache 38. These main predictors and branch target address cache have a larger and more complex structure than the μBTB 32, which enables them generally to more reliably predict branch target addresses, in particular in the case of polymorphic indirect branches, for which storage of multiple possible target addresses and for the selection between them based on previous history is provided.

The output of the main predictors and branch target address cache 38 is passed back to the address generation circuitry 30, such that the instruction fetch process can continue based on the prediction made. Note from FIG. 2 that the output of the main predictors and branch target address cache 38 is also received by comparator circuitry 40. Comparator circuitry 40 receives its other input from the output of the μBTB 32, such that a comparison can be made between any prediction made by the μBTB 32 and by the main predictors and branch target address cache 38. The outcome of this comparison, i.e. a confirmation or a non-confirmation of the prediction made by the μBTB 32 is returned to the μBTB 32, such that it can update the confidence value (and possibly the lock value) of a given entry as a result. FIG. 2 also illustrates branch resolution circuitry 42 forming part of an execution stage of the pipelined data processing apparatus, which can signal a branch resolution outcome to either or both of the main predictors and branch target address cache 38 and the μBTB 32. This provides an alternative to the "confirmation" and "non-confirmation" signal received by the μBTB 32, which can therefore update the corresponding entry on the basis of the true branch resolution outcome. However, depending on the implementation of the present techniques, updating the μBTB 32 on the basis of the outcome of the main predictors and branch target address cache 38 may be sufficient, or indeed preferable.

Figure 3:
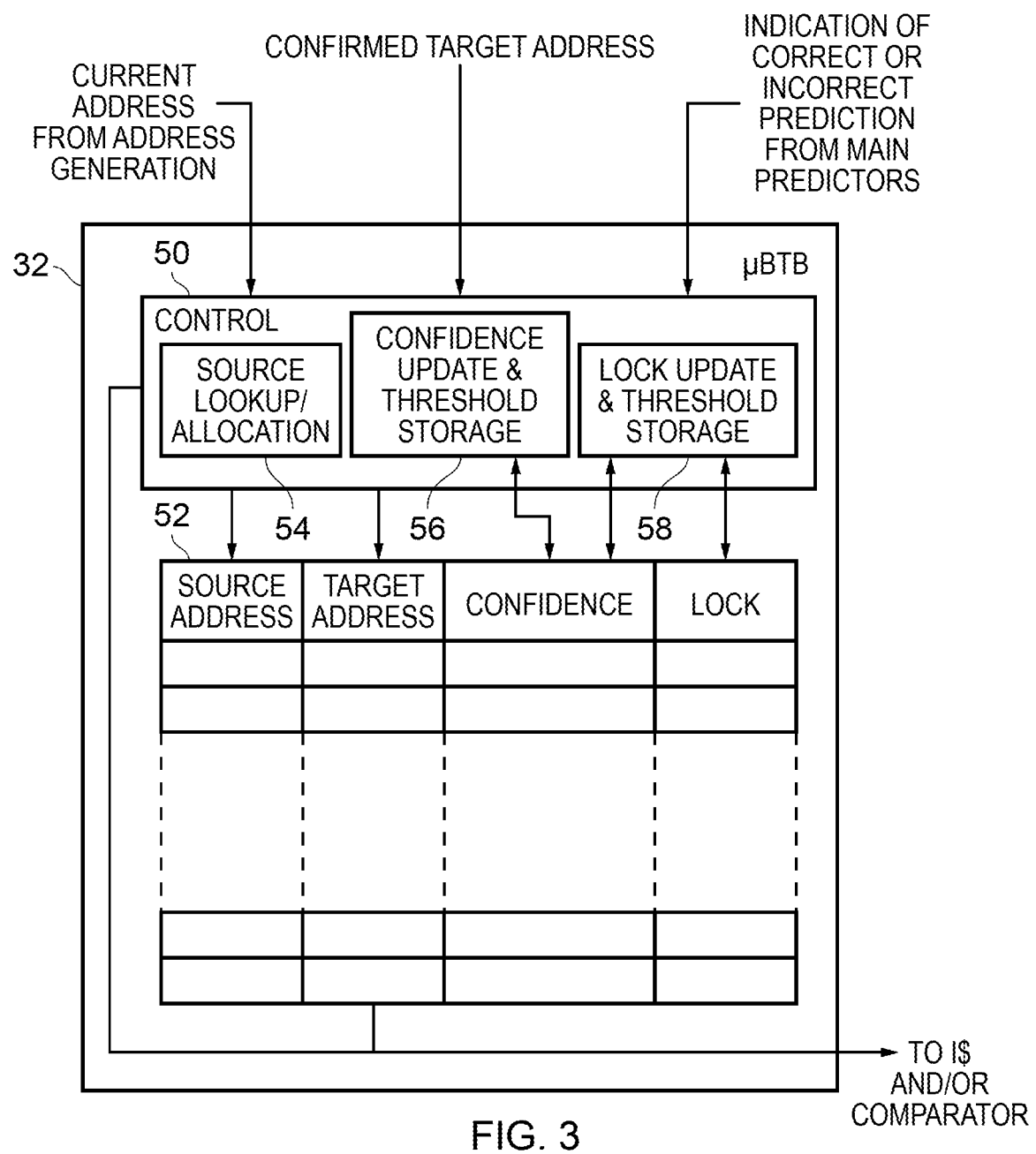
FIG. 3 schematically illustrates in more detail the configuration of branch target storage in one embodiment.

FIG. 3 schematically illustrates the micro branch target buffer (μBTB 32) in more detail. The μBTB 32 comprises control circuitry 50 and storage 52. The storage 52 is arranged as described with respect to item 18 in FIG. 1, namely that entries are provided which store a source address, a target address, a confidence value, and a lock value. The control circuitry 50 maintains overall control of the μBTB 32, and in particular administers the entries within the storage 52. For this purpose, the control circuitry 50 comprises source lookup/allocation circuitry 54, which on receipt of a current address from the address generation circuitry looks up this source address within the entries stored in storage 52, and when no source address entry matches the current address, causes a new entry to be allocated in order for this current address to be populated as a source address within that newly allocated entry. For an entry which does have a source address matching the current address, the control circuitry 50 examines the confidence value stored in association with that entry by means of its confidence update and threshold storage circuitry 56, in order to determine firstly if the confidence value exceeds the defined confidence value threshold. The control circuitry 50 also comprises lock update and threshold storage circuitry 58, which can compare the lock value stored in association with a given entry to the confidence lock threshold value which it stores. Thus, in accordance with the procedure described above, when the μBTB 32 determines that the current address which has been received matches a source address in one of its entries, it will pass the target address to the instruction cache 34 if the confidence value stored in association with this entry exceeds the confidence threshold and if the entry is not locked. As shown in FIG. 3, the μBTB 32 also receives a confirmed target address as well as an indication of whether or not its prediction was confirmed as correct or incorrect from the main predictors 58 later in the pipeline. In the context of FIG. 3 it should understood that the "confirmed" target address therefore corresponds to the predicted target address generated by the main predictors 38, which it should be understood may itself ultimately prove to be incorrect (when the branch resolves), but the content of the μBTB 32 is maintained and updated on the basis of the outputs of the main predictors and branch target address cache 38. The confidence value for an entry is decreased when it is indicated to have been an incorrect prediction by the main predictors, whilst it is increased when confirmation that it was a correct prediction is received. Further, the μBTB 32 also stores a confidence lock threshold in the lock update and threshold storage circuitry 58, which determines if the confidence value of an entry has reached the confidence lock threshold. In this situation, when a incorrect prediction indication for the corresponding entry is received from the main predictors, the lock update and threshold storage circuitry 58 responds by triggering the locking mechanism for this entry. In the example of FIG. 3 this corresponds to a lock value stored for the entry being decremented from its "unlocked" value of 11 to an intermediate value of 10, and a further triggering of the locking mechanism, i.e. when a further indication of incorrect prediction is received from the main predictors, causes this lock value to be decremented to 01, and finally a further incorrect prediction causes the lock value to be decremented to 00, this final value indicating that the entry is now locked. It is important to note that the signal received by the μBTB 32 indicating a correct or incorrect prediction does not necessarily imply that a target address prediction has been generated by the μBTB 32 and retrieved from either of the instruction cache 34 or further in the memory hierarchy. This is due to the fact that the confidence value of a given entry must exceed the confidence threshold in order for that prediction to be made. Nevertheless, the apparatus continues to compare the "shadow prediction" of the μBTB 32 (i.e. the prediction it would have made for this source address if the confidence value had exceeded the confidence threshold). This is important because this enables an entry which has fallen below the confidence threshold to return to active prediction of target addresses if the entry once more becomes reliable for target address prediction and its confidence value rises. This may for example be the case if the branch target for the corresponding branch instruction has been through a period during which the target address has varied several times, causing the predictions of the μBTB 32 to fail several times, but has then returned to a situation in which the target address for this branch instruction does not vary for several iterations of this instruction, allowing the μBTB 32 to accurately provide a target address prediction. Nevertheless, it should be appreciated that in the example of FIG. 3 the lock update circuitry 58, in combination with the locking values which it stores for the entries in the storage 52, can only update the lock value towards the value of 11, indicating that the entry is locked, and therefore if the μBTB 32 fails to accurately predict the target address for a branch instruction on several separate occasions having already reached the confidence lock threshold, then, regardless of its success in the interim at predicting target addresses for this branch instruction, the failure to predict whilst having reached the confidence lock threshold on several occasions will cause the entry to become locked.

Figure 4:
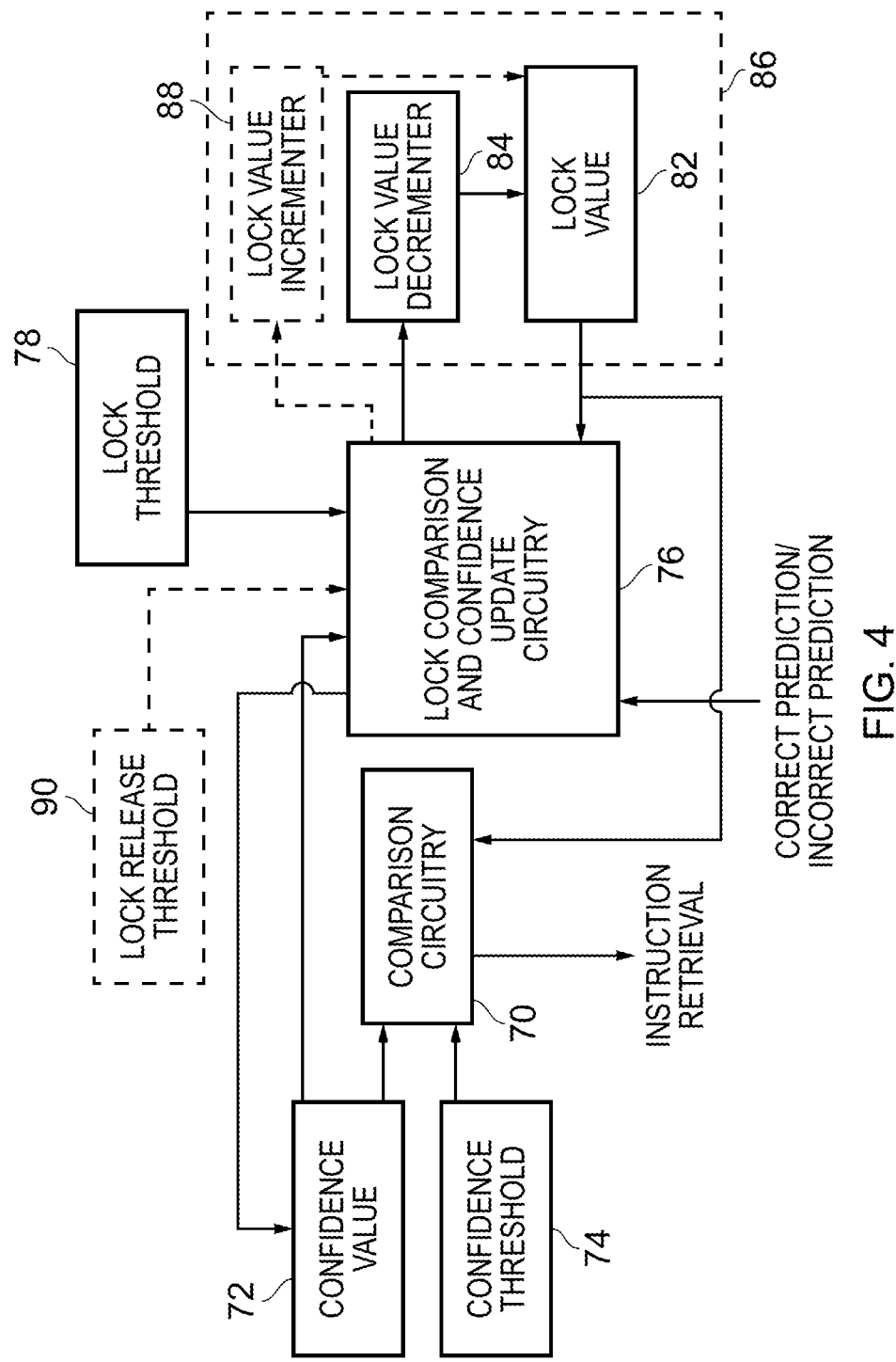
FIG. 4 schematically illustrates branch confidence value and lock value circuitry in one embodiment.

FIG. 4 schematically illustrates the configuration of the components of control circuitry 50 which relates to the administration of the confidence value/threshold and the lock value/threshold in one example. This circuitry comprises comparison circuitry 70 which receives a confidence value 72 from a given entry under consideration and the value stored in the confidence threshold storage 74. On the basis of this comparison the comparison circuitry indicates whether instruction retrieval from the target address of this entry should take place, i.e. whether a target prediction for this branch instruction should be made. The circuitry in FIG. 4 also comprises lock comparison and confidence update circuitry 76 which compares the confidence value 72 with a confidence lock threshold value stored in lock threshold storage 78. The lock comparison and confidence update circuitry 76 also receives the indication of correct prediction or incorrect prediction and generally will increase the confidence value 72 following a correct prediction (if the confidence value is not already at its maximum) and will decrease the confidence value 72 (if it has not already reached its minimum) in response to an indication of an incorrect prediction. However, this confidence update can be overruled by the lock value 82 held for the entry under consideration, which, if it has reached the value indicating a locked entry, prevents the lock comparison and confidence update circuitry 76 from making further adjustment to the confidence value 72. The locked value can also directly indicate to the comparison circuitry 70 that no prediction (instruction retrieval) should be made for this entry.

The lock comparison and confidence update circuitry 76 combines the comparison of the confidence value with the confidence lock threshold value with the information indicating a correct or incorrect prediction, to then signal to the lock value decrementer circuitry 84 when the confidence value is at the lock threshold and an incorrect prediction has been made. In response the lock value decrementer 84 then decrements the lock value. The lock value decrementer 84 and lock value 82 can thus be considered together to be lock circuitry 86, providing a lock counter, which is configured only to decrement until its final lock value is reached. FIG. 4 also, by means of dashed lines, indicates a variation in which a lock release threshold value 90 is stored, and a lock value incrementer 88 forms part of the lock circuitry 86. When these components are implemented, the confidence value may continue to be updated, despite the entry being locked, but the locked entry prevents the comparison circuitry from triggering the instruction retrieval. The lock comparison circuitry 76 compares the confidence value of an entry with the lock release threshold value 90 and in the situation where an entry has been locked (indicated by the lock value 82), but the confidence value later exceeds the lock release threshold, signals to the lock value incrementer 88 to increment the lock value, i.e. away from the locked value, such that the entry is released. Thus it will be understood that the lock threshold 78 is set below the confidence threshold 74, and that the lock release threshold (when implemented) must be above the lock threshold, but can be above or below the confidence threshold depending on how easily this lock release should happen. Assuming that releasing the lock should be a relatively rare event, the lock release threshold will then typically be set above the confidence threshold.

Figure 5A:
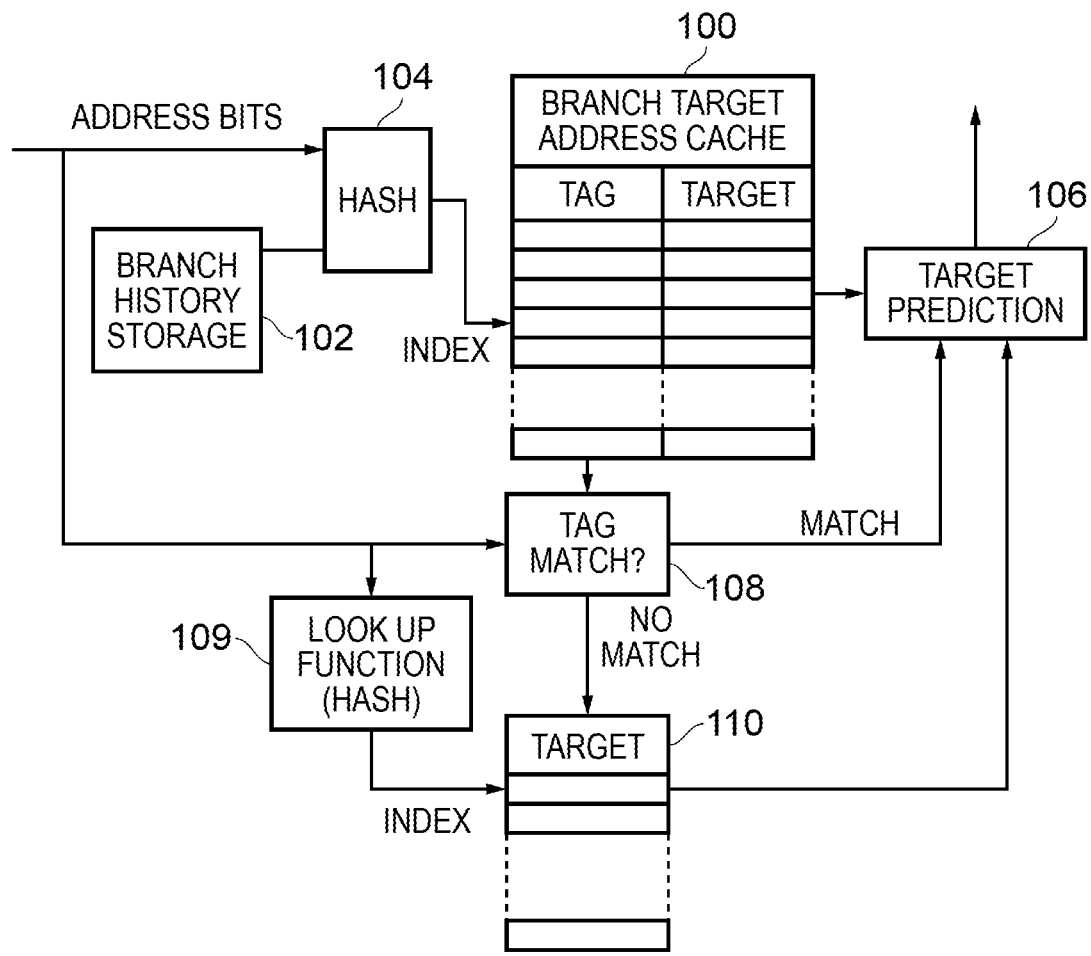
FIG. 5A schematically illustrates further branch target storage in one embodiment and FIG. 5B schematically illustrates an alternative to the configuration of FIG. 5A in which the target prediction of a first branch target storage is reused in one embodiment.
Figure 5B:
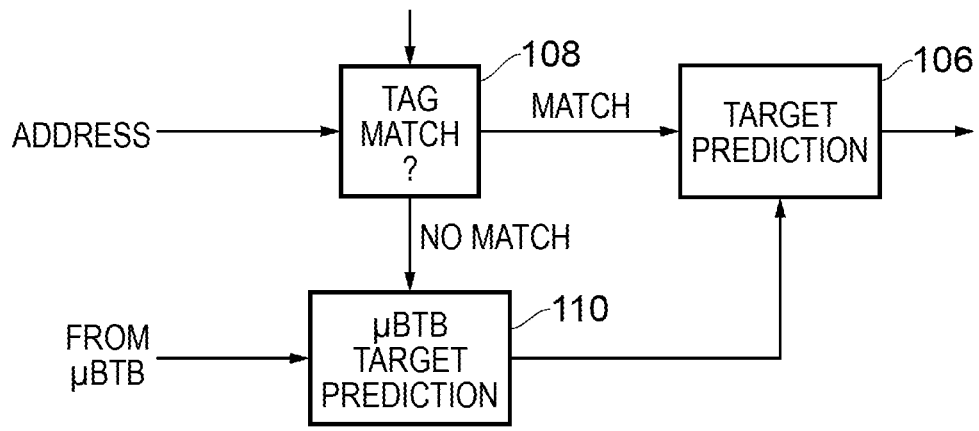

FIGS. 5A and 5B schematically illustrate two example configurations of the main predictors and branch target address cache 38 of FIG. 2. FIG. 5B represents an alternative to the lower part of FIG. 5A as will be discussed in more detail below. Beginning with FIG. 5A, a branch target address cache (BTAC) 100 is provided and is capable of storing more than one target address corresponding to a given branch instruction. In fact, as shown in FIG. 5A, the branch target address cache 100 stores a TAG portion of the branch instruction address as well as a corresponding target address. A given branch instruction may have more than one entry in the branch target address cache 100, enabling the apparatus to handle polymorphic indirect branches, where the target address may take a number of values depending on the context in which the branch instruction is being used. Branch history storage 102 is also shown in FIG. 5A which enables the apparatus to select between multiple entries within the BTAC 100 for a given branch instruction. This is carried out by means of the hashing circuitry 104 which combines a set of address bits from the branch instruction address and information (bits) from the branch history storage 102 via a hashing function which generates an index into the BTAC 100. If the TAG portion stored matches (in TAG match circuitry 108) the relevant portion of the address bits received, then the target prediction 106 derived from the BTAC 100 is released as the branch target prediction.

However, in the case that the match is not found, this causes reference to be made to a further branch target buffer 110, which contains a set of target addresses, and the address bits are used in lookup function circuitry 109 (implementing a hash function in this example) to provide an index into this storage, such that a target prediction 106 can be generated. This further branch target buffer 110 has a simple one-to-one correspondence between source addresses and target addresses. FIG. 5B schematically illustrates a variation in which the further branch target storage 110 is effectively replaced by the µBTB 32, in that when no matching entry is found by the TAG match circuitry 108 then the prediction generated by the µBTB 32 is used to provide the target prediction 106.

Figure 6A:
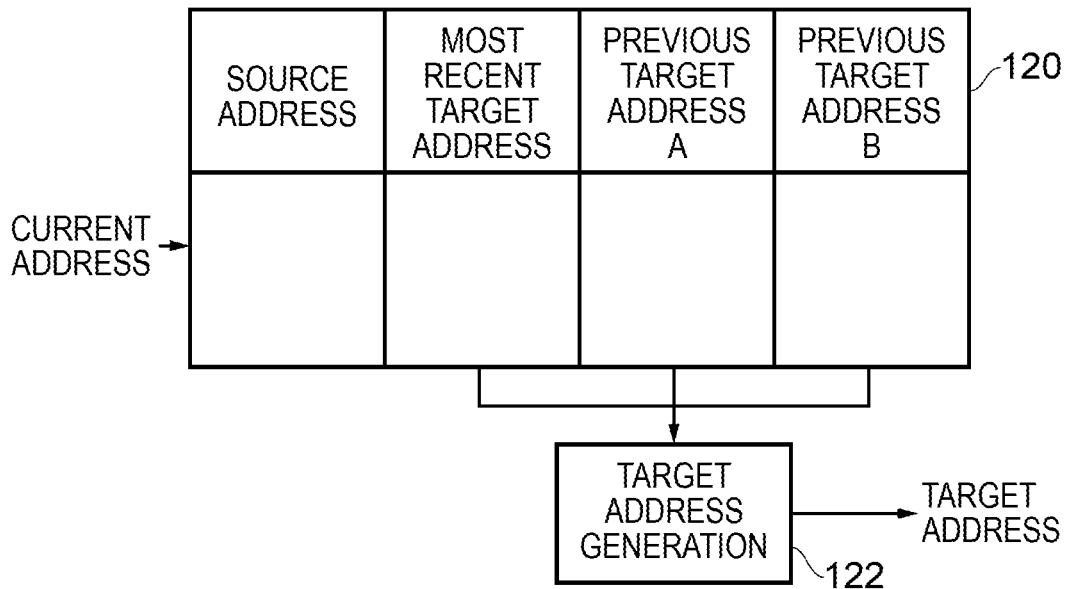
FIG. 6A schematically illustrates the storage of multiple previous target addresses from which a predicted target address is generated and FIG. 6B schematically illustrates an alternative to the configuration of FIG. 6A in which a separate storage is provided for the multiple previous target addresses in one embodiment.
Figure 6B:
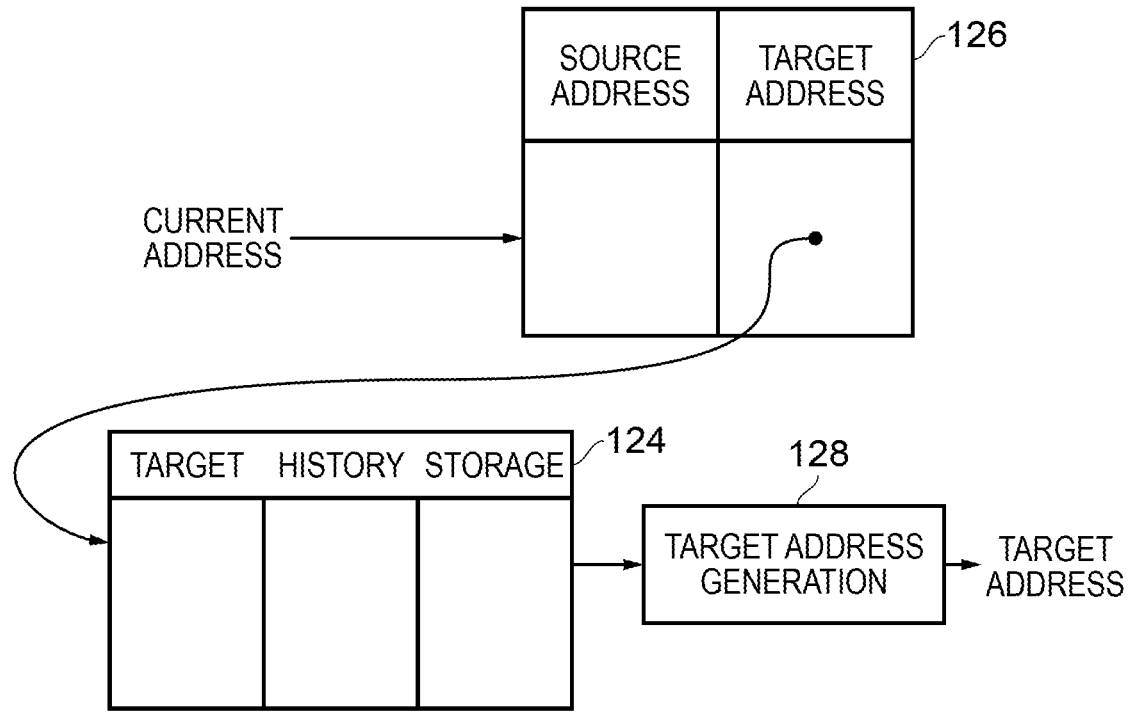

FIGS. 6A and 6B illustrate schematically two variations on the configuration of the branch target storage 14 or the µBTB 32, wherein more than one recent target address is stored for a given source address. Note that in the configurations described above of the branch target storage 14 and the µBTB 32 only one target address is stored for each source address and this corresponds to the most recent target address for that source address. However, in the examples given in FIGS. 6A and 6B three most recent target addresses are stored, namely the most recent target address and the two previous target addresses A & B which preceded that (in usage). Hence in the example of FIG. 6A the storage 120 comprises entries which store a source address, and three target addresses, and the branch target storage is further provided with target address generation circuitry 122 which combines this information to generate a single target address in response to a current address which matched a source address in one of its entries. In one example, the target address generation circuitry will take the most recent target address in the situation where all three target addresses differ, but if two target addresses match then it will generate this address in place of the other target address, such that if previous target address A and previous target address B match then this overrides the most recent target address. FIG. 6B schematically illustrates a variation in which the multiple target history storage 124 is provided separately from the branch target storage 126 and a pointer stored in the entry for the target address indicates an entry in the target address storage 124. Target address generation circuitry 128 then (as described above with reference to target address generation circuitry 122) generates a target address on the basis of the multiple target addresses stored.

Figure 7:
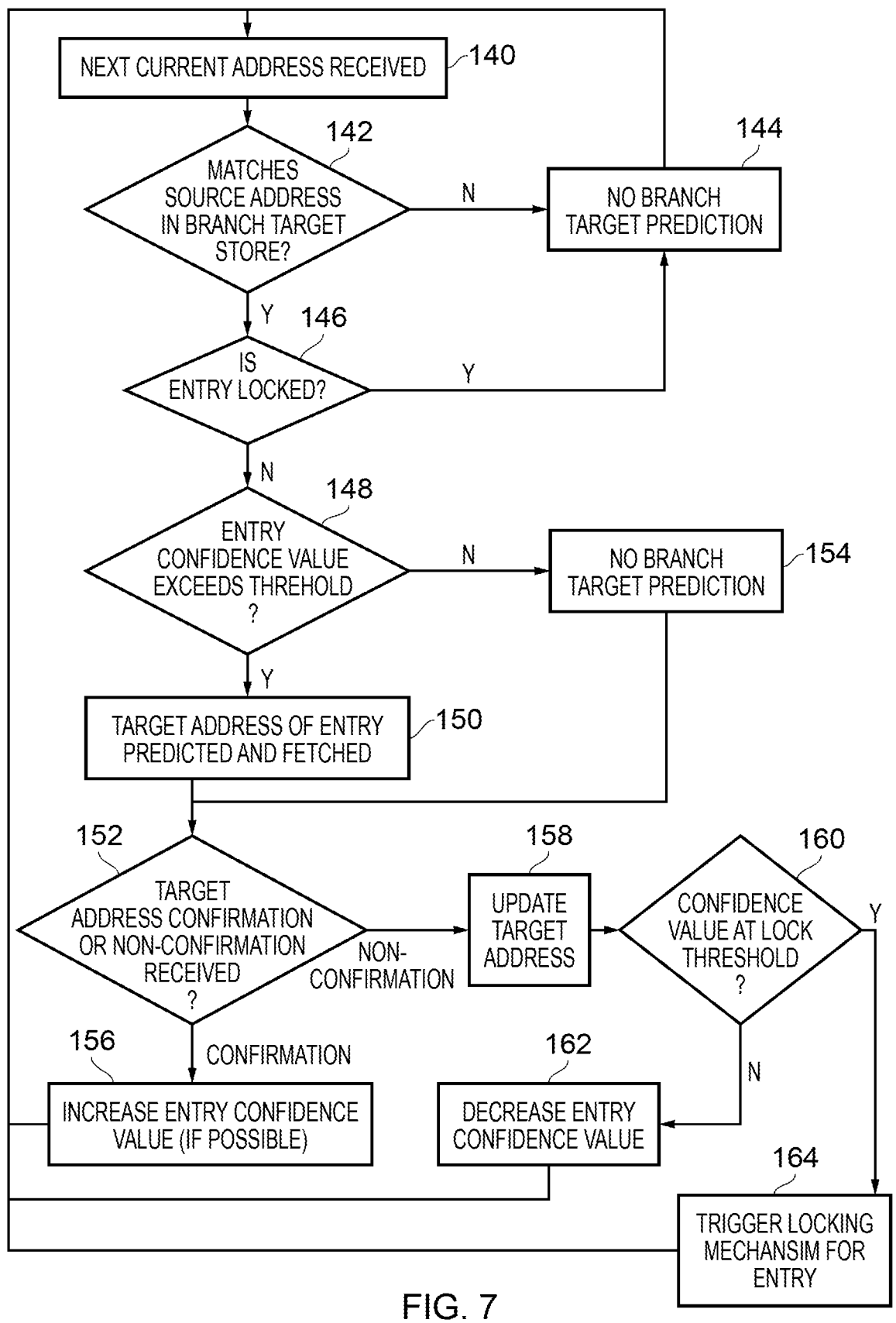
FIG. 7 shows a sequence of steps which are taken according to the method of one embodiment.

FIG. 7 illustrates a set of steps which are taken for one example method. The flow can be considered to begin at step 140, where the next current address is received. It is then determined at step 142 if this current address matches a source address stored in the branch target store. If it does not then the flow proceeds to step 144, no branch target prediction is made, and the flow returns to step 140. If however there is a match between the current address and a source address in the branch target store then the flow proceeds to step 146, where it is determined if the entry is locked. If it is then the flow also proceeds back to step 144, no branch target prediction is made, and the flow returns to step 140. If however the entry is not locked then the flow proceeds to step 148 where it is determined if the confidence value of this entry exceeds the defined confidence threshold. If it does then at step 150 the target address stored for this entry is used as the prediction and is fetched from memory. It is then determined at step 152 whether the target address (whether fetched from memory or not) has been confirmed as correct. Note that at step 148 if the confidence value of this entry did not exceed the threshold then the flow proceeds via step 154, bypassing step 150 and the target address of the entry is not fetched. However, as mentioned above, whether or not the target address has been fetched the "correctness" of this target address is determined at step 152. If the target address is confirmed as correct then the flow proceeds via step 156 where the confidence value of the entry is increased (if possible) and the flow returns to step 140. If however at step 142 a non-confirmation signal is received, i.e. the target address stored for this entry was not correct (whether or not it was in fact fetched) then the flow proceeds to step 158 where the target address for this entry is updated and it is then determined at step 160 if the confidence value for this entry is at the lock threshold. If it is not then the confidence value for the entry is decreased at step 162 and the flow returns to step 140. If however at step 160 it is determined that the confidence value is already at the lock threshold then the flow proceeds via step 164 where the locking mechanism is triggered for this entry. As described above, this may comprise immediately marking the entry as locked, or for example decrementing a lock counter, such that multiple passes through step 162 are required before the entry is considered to be "locked".

By way of overall summary an apparatus comprises instruction fetch circuitry to retrieve instructions from storage and branch target storage to store entries comprising source and target addresses for branch instructions. A confidence value is stored with each entry and when a current address matches a source address in an entry, and the confidence value exceeds a confidence threshold, instruction fetch circuitry retrieves a predicted next instruction from a target address in the entry. Branch confidence update circuitry increases the confidence value of the entry on receipt of a confirmation of the target address and decreases the confidence value on receipt of a non-confirmation of the target address. When the confidence value meets a confidence lock threshold below the confidence threshold and non-confirmation of the target address is received, a locking mechanism with respect to the entry is triggered. A corresponding method is also provided.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
   instruction fetch circuitry to retrieve instructions from storage by reference to addresses at which the instructions are stored;
   branch target storage to store entries comprising source and target addresses for branch instructions, wherein the branch target storage is capable of storing a confidence value associated with an entry and the branch target storage is responsive to a current address matching a source address in the entry and the confidence value exceeding a confidence threshold to issue a signal to the instruction fetch circuitry to retrieve a predicted next instruction from a target address in the entry; and branch confidence update circuitry to increase the confidence value of the entry in response to receipt of a confirmation of the target address and to decrease the confidence value of the entry in response to receipt of a non-confirmation of the target address, wherein the branch confidence update circuitry is responsive to (a) the confidence value meeting a confidence lock threshold below the confidence threshold and (b) receipt of the non-confirmation of the target address, and wherein subsequent to (a) and (b), the branch confidence update circuitry is configured to lock the entry which prevents issuance of the signal to the instruction fetch circuitry with respect to the locked entry, and wherein a locking mechanism is configured to mark the entry as the locked entry and the branch confidence update circuitry is responsive to the locked entry to cease further modification of the confidence value of the locked entry, further comprising branch target prediction circuitry comprising further branch target storage capable of storing entries comprising target addresses for branch instructions, wherein the further branch target storage is capable of storing at least two different target addresses in association with the source address, and the branch target prediction circuitry is responsive to the current address corresponding to the source address to select between the at least two target addresses in dependence on history information stored for the current address to provide a target address prediction, wherein the apparatus has a pipeline arrangement comprising a pipeline, the branch target storage is in a preceding stage of the pipeline, the instruction fetch circuitry is in a succeeding stage of the pipeline, and the branch target prediction circuitry is in a further succeeding stage of the pipeline, and the branch target storage precedes the instruction fetch circuitry in the pipeline arrangement and the branch target prediction circuitry follows the instruction fetch circuitry in the pipeline arrangement.

2. The apparatus as claimed in claim 1, wherein the branch target storage is responsive to the current address matching the source address in the locked entry to prevent issuance of the signal to the instruction fetch circuitry to retrieve the predicted next instruction from the target address.

3. The apparatus as claimed in claim 1, wherein the locking mechanism comprises lock counter circuitry to hold a lock counter value for the entry and to update the lock counter value towards a lock trigger value in response to a triggering of the locking mechanism, wherein the lock counter value having the lock trigger value indicates that the entry is locked.

4. The apparatus as claimed in claim 3, wherein a range of the confidence value for the entry exceeds a range of the lock value for the entry.

5. The apparatus as claimed in claim 1, wherein the branch target storage is responsive to receipt of the non-confirmation of the target address to update the entry with a confirmed target address for the source address.

6. The apparatus as claimed in claim 1, wherein the branch target storage is responsive to receipt of the non-confirmation of the target address to update the entry with a replacement target address for the source address, wherein the replacement target address is determined from a history of more than one recent confirmed target addresses.

7. The apparatus as claimed in claim 1, wherein the branch target prediction circuitry comprises target address comparison circuitry to perform a comparison of its target address prediction with the target address from the branch target storage and to signal either the confirmation of the target address or the non-confirmation of the target address in dependence on a result of the comparison.

8. The apparatus as claimed in claim 1, wherein the branch target prediction circuitry comprises a second further branch target storage to store entries comprising source and target addresses for branch instructions, wherein the branch target prediction circuitry is responsive to no entry in the further branch target storage being selected to provide the target address prediction from the second further branch target storage.

9. The apparatus as claimed in claim 1, wherein the branch target prediction circuitry is responsive to no entry in the further branch target storage being selected to provide the target address from the branch target storage as the target address prediction.

10. The apparatus as claimed in claim 1, further comprising branch resolution circuitry to signal the confirmation of the target address or the non-confirmation of the target address in dependence on a branch resolution of a branch instruction stored at the source address.

11. The apparatus as claimed in claim 1, wherein the branch target storage is responsive to the current address matching the source address in the entry and the confidence value not exceeding the confidence threshold to issue a signal to the instruction fetch circuitry to retrieve a next instruction from an address which sequentially follows the current address.

12. A method of data processing comprising:
retrieving, by instruction fetch circuitry, instructions from storage by reference to addresses at which the instructions are stored;
storing entries comprising source and target addresses for branch instructions in a branch target storage;
storing a confidence value associated with an entry in the branch target storage;
retrieving a predicted next instruction from a target address in the entry, when a current address matches a source address in the entry and the confidence value exceeds a confidence threshold by issuing a signal from the branch target storage to the instruction fetch circuitry;
increasing the confidence value in response to receipt of a confirmation of the target address;
decreasing the confidence value of the entry in response to receipt of a non-confirmation of the target address;
detecting (a) the confidence value meeting a confidence lock threshold below the confidence threshold and (b) receipt of the non-confirmation of the target address;
subsequent to (a) and (b) being detected, locking the entry which prevents issuance of the signal to instruction fetch circuitry with respect to the locked entry;
marking the entry as the locked entry; and
in response to the locked entry, ceasing further modification of the confidence value of the locked entry,
further comprising storing, in branch target prediction circuitry comprising further branch target storage, entries comprising target addresses for branch instructions, wherein the further branch target storage is capable of storing at least two different target addresses in association with the source address, and, responsive to the current address corresponding to the source address, selecting between the at least two target addresses in dependence on history information stored for the current address to provide a target address prediction, wherein the branch target storage precedes the instruction fetch circuitry in a pipeline arrangement and the branch target prediction circuitry follows the instruction fetch circuitry in the pipeline arrangement, where the pipeline arrangement comprises a pipeline, the branch target storage is in a preceding stage of the pipeline, the instruction fetch circuitry is in a succeeding stage of the pipeline, and the branch target prediction circuitry is in a further succeeding stage of the pipeline.

13. An apparatus comprising:

means for retrieving instructions from storage by reference to addresses at which the instructions are stored;

means for storing entries comprising source and target addresses for branch instructions;

means for storing a confidence value associated with an entry in the means for storing entries;

means for retrieving a predicted next instruction from a target address in the entry, when a current address matches a source address in the entry and the confidence value exceeds a confidence threshold by issuing a signal from the means for storing entries to the means for retrieving instructions;

means for increasing the confidence value in response to receipt of a confirmation of the target address;

means for decreasing the confidence value of the entry in response to receipt of a non-confirmation of the target address;

means for detecting (a) the confidence value meeting a confidence lock threshold below the confidence threshold and (b) receipt of the non-confirmation of the target address, means, subsequent to (a) and (b) being detected, for locking the entry which prevents issuance of the signal to instruction fetch circuitry with respect to the locked entry, and wherein the means for locking is configured to mark the entry as the locked entry and the means for increasing and the means for decreasing are responsive to the locked entry to cease further modification of the confidence value of the locked entry, further comprising branch target prediction means comprising further branch target storage means capable of storing entries comprising target addresses for branch instructions, wherein the further branch target storage means is capable of storing at least two different target addresses in association with the source address, and the branch target prediction means is responsive to the current address corresponding to the source address to select between the at least two target addresses in dependence on history information stored for the current address to provide a target address prediction, wherein the apparatus has a pipeline arrangement comprising a pipeline, the means for storing entries is in a preceding stage of the pipeline, the means for retrieving instructions is in a succeeding stage of the pipeline, and the branch target prediction means is in a further succeeding stage of the pipeline, and the means for storing entries precedes the means for retrieving instructions in the pipeline arrangement and the branch target prediction means follows the means for retrieving instructions in the pipeline arrangement.

* * * * *